US011759662B2

(12) United States Patent
Schrank (10) Patent No.: US 11,759,662 B2
(45) Date of Patent: Sep. 19, 2023

(54) FALL-PROTECTION APPARATUS COMPRISING DUAL-ACTUATABLE BRAKING DEVICE

(71) Applicant: 3M INNOVATIVE PROPERTIES COMPANY, St. Paul, MN (US)

(72) Inventor: Greg E. Schrank, Bloomington, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 18/013,164

(22) PCT Filed: Jun. 23, 2021

(86) PCT No.: PCT/IB2021/055568
§ 371 (c)(1),
(2) Date: Dec. 27, 2022

(87) PCT Pub. No.: WO2022/003500
PCT Pub. Date: Jan. 6, 2022

(65) Prior Publication Data
US 2023/0241423 A1    Aug. 3, 2023

Related U.S. Application Data

(60) Provisional application No. 62/705,533, filed on Jul. 2, 2020.

(51) Int. Cl.
*A62B 1/10*    (2006.01)
(52) U.S. Cl.
CPC ..................... *A62B 1/10* (2013.01)

(58) Field of Classification Search
CPC .... A62B 1/00; A62B 1/08; A62B 1/10; A62B 35/00; A62B 35/0093
USPC .................................................. 182/239, 237
See application file for complete search history.

(56) References Cited

U.S. PATENT DOCUMENTS

| 4,877,110 | A | * | 10/1989 | Wolner | .............. A62B 35/0093 D29/124 |
| 5,217,084 | A | * | 6/1993 | Olson | ....................... A62B 1/10 182/234 |
| 5,447,280 | A | | 9/1995 | Feathers | |
| 5,722,612 | A | * | 3/1998 | Feathers | ............ A62B 35/0093 242/381.5 |
| 5,835,007 | A | | 11/1998 | Kosiak | |

(Continued)

FOREIGN PATENT DOCUMENTS

| JP | 2001149490 A | 6/2001 |
| NZ | 715391 | 12/2015 |

(Continued)

OTHER PUBLICATIONS

International Search Report for PCT International Application No. PCT/IB2021/055568, dated Sep. 21, 2021, 3 pages.

*Primary Examiner* — Daniel P Cahn
*Assistant Examiner* — Shiref M Mekhaeil
(74) *Attorney, Agent, or Firm* — Kenneth B. Wood (57) ABSTRACT

A fall-protection apparatus with a rotationally-activated braking device including at least one first pawl that is a velocity-actuated pawl and at least one second pawl that is an acceleration-actuated pawl, the at least one first pawl and the at least one second pawl being independently actuated and independently functioning.

20 Claims, 7 Drawing Sheets

(56) References Cited

U.S. PATENT DOCUMENTS

| | | |
|---|---|---|
| 5,928,300 A | 7/1999 | Rogers et al. |
| 7,206,680 B2 | 4/2007 | Roelleke |
| 7,281,620 B2 * | 10/2007 | Wolner ............... F16D 63/006 192/223.1 |
| 7,460,937 B2 | 12/2008 | Lahmann et al. |
| 7,484,585 B2 | 2/2009 | Takemura |
| 7,912,608 B2 | 3/2011 | Willerton |
| 8,181,744 B2 | 5/2012 | Parker et al. |
| 8,256,574 B2 | 9/2012 | Griffiths et al. |
| 8,430,206 B2 * | 4/2013 | Griffiths ............ A62B 35/0093 182/237 |
| 8,430,207 B2 | 4/2013 | Griffiths et al. |
| 8,511,434 B2 | 8/2013 | Blomberg |
| 9,121,462 B2 * | 9/2015 | Casebolt ........... A62B 35/0093 |
| 9,488,235 B2 * | 11/2016 | Casebolt ................ F16D 59/00 |
| 10,020,720 B2 * | 7/2018 | Diehl .................. B60L 15/2054 |
| 10,110,089 B2 * | 10/2018 | Diehl ....................... B60L 7/28 |
| 10,143,867 B2 * | 12/2018 | Su ..................... A62B 35/0075 |
| 10,792,523 B2 * | 10/2020 | Casebolt ........... A62B 35/0093 |
| 2004/0073346 A1 | 4/2004 | Roelleke |
| 2005/0051659 A1 * | 3/2005 | Wolner ............. A62B 35/0093 242/383.5 |
| 2007/0151805 A1 * | 7/2007 | Betcher ............. A62B 35/0093 182/239 |
| 2007/0228713 A1 | 10/2007 | Takemura |
| 2008/0059028 A1 | 3/2008 | Willerton |
| 2009/0178887 A1 * | 7/2009 | Reeves ................... A62B 1/10 182/239 |
| 2009/0211848 A1 * | 8/2009 | Parker ..................... A62B 1/10 182/231 |
| 2010/0224448 A1 * | 9/2010 | Wolner ................... A62B 1/10 182/234 |
| 2010/0226748 A1 * | 9/2010 | Wolner ............. A62B 35/0093 414/815 |
| 2011/0100755 A1 * | 5/2011 | Meillet ................... A62B 1/10 188/69 |
| 2013/0105247 A1 * | 5/2013 | Casebolt ............... A62B 1/10 188/185 |
| 2013/0277631 A1 | 10/2013 | Luntz et al. |
| 2016/0096048 A1 | 4/2016 | Fegley et al. |
| 2017/0328424 A1 * | 11/2017 | Allington ................ A62B 1/08 |
| 2018/0370484 A1 | 12/2018 | Diehl et al. |

FOREIGN PATENT DOCUMENTS

| | | |
|---|---|---|
| WO | 2017072436 A1 | 5/2017 |
| WO | 2017105255 A1 | 6/2017 |
| WO | 2019012454 A1 | 1/2019 |
| WO | 2022003501 A1 | 1/2022 |
| WO | 2022009174 A1 | 1/2022 |

* cited by examiner

FALL-PROTECTION APPARATUS COMPRISING DUAL-ACTUATABLE BRAKING DEVICE

CROSS REFERENCE TO RELATED APPLICATIONS

This application is a national stage filing under 35 U.S.C. 371 of PCT/IB2021/055568, filed 23 Jun. 2021, which claims the benefit of U.S. Provisional Patent Application No. 62/705,533, filed 2 Jul. 2020, the disclosure of which is incorporated by reference in its/their entirety herein.

BACKGROUND

Fall-protection apparatus such as self-retracting lifelines have often found use in applications such as building construction and the like.

SUMMARY

In broad summary, herein is disclosed a fall-protection apparatus comprising a rotationally-activated braking device comprising at least one first pawl that is a velocity-actuated pawl and at least one second pawl that is an acceleration-actuated pawl, the at least one first pawl and the at least one second pawl being independently actuated and independently functioning. These and other aspects will be apparent from the detailed description below. In no event, however, should this broad summary be construed to limit the claimable subject matter, whether such subject matter is presented in claims in the application as initially filed or in claims that are amended or otherwise presented in prosecution.

Like reference numbers in the various figures indicate like elements. Some elements may be present in identical or equivalent multiples; in such cases only one or more representative elements may be designated by a reference number but it will be understood that such reference numbers apply to all such identical elements. Unless otherwise indicated, all figures and drawings in this document are not to scale and are chosen for the purpose of illustrating different embodiments of the invention. In particular the dimensions of the various components are depicted in illustrative terms only, and no relationship between the dimensions of the various components should be inferred from the drawings, unless so indicated. Although terms such as "front", "back", "outward", "inward", and "first" and "second" may be used in this disclosure, it should be understood that those terms are used in their relative sense only unless otherwise noted. Terms such as "top", "bottom", "upper", "lower", "under", "over", "horizontal", "vertical", and "up" and "down" will be understood to have their usual meaning with respect to the Earth.

Figure 2:
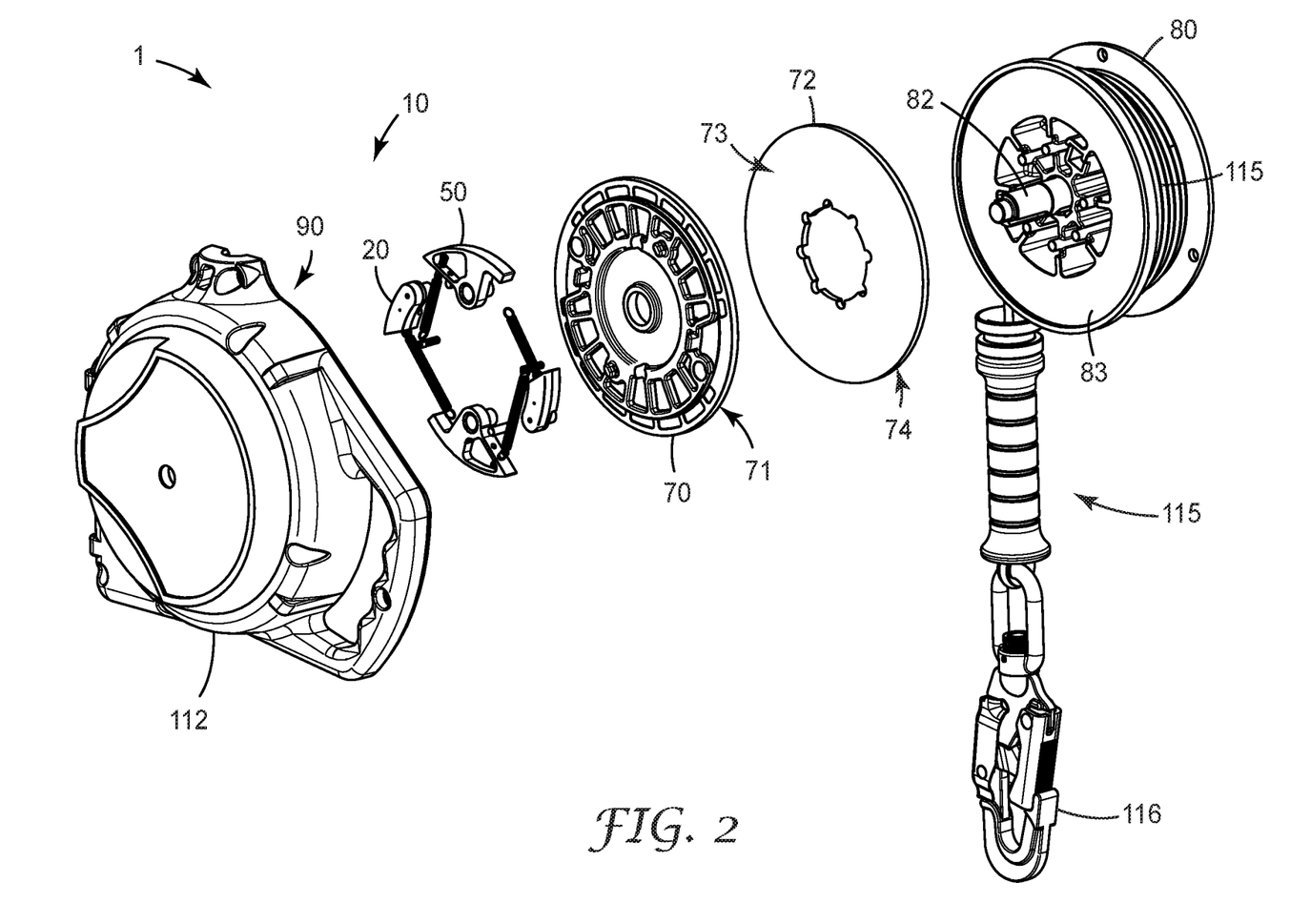
FIG. 2 is a perspective partially-exploded view of various components of an exemplary fall-protection apparatus.

Geometric descriptors are used herein, unless otherwise specified, with reference to a drum 80 and an associated pawl-support plate 70 of a fall-protection apparatus as described in detail herein and as shown e.g. in FIG. 2. The term "axially" refers to a direction at least generally parallel to the axis of rotation of the drum, plate, and associated components. The term "radial" and like terms refers to a direction generally parallel to the radius and diameter of the drum and plate and generally perpendicular to the axial direction. (For examples, lines 31 and 32 of FIG. 5 each extend in a radial direction.) The terms circumferential, circumferentially, and like terms, refer to an arcuate direction that exhibits a generally constant radius relative to the axis of rotation of the drum and associated components (for example, orbital pathway 25 as indicated on FIG. 5, follows a circumferential path).

Figure 5:
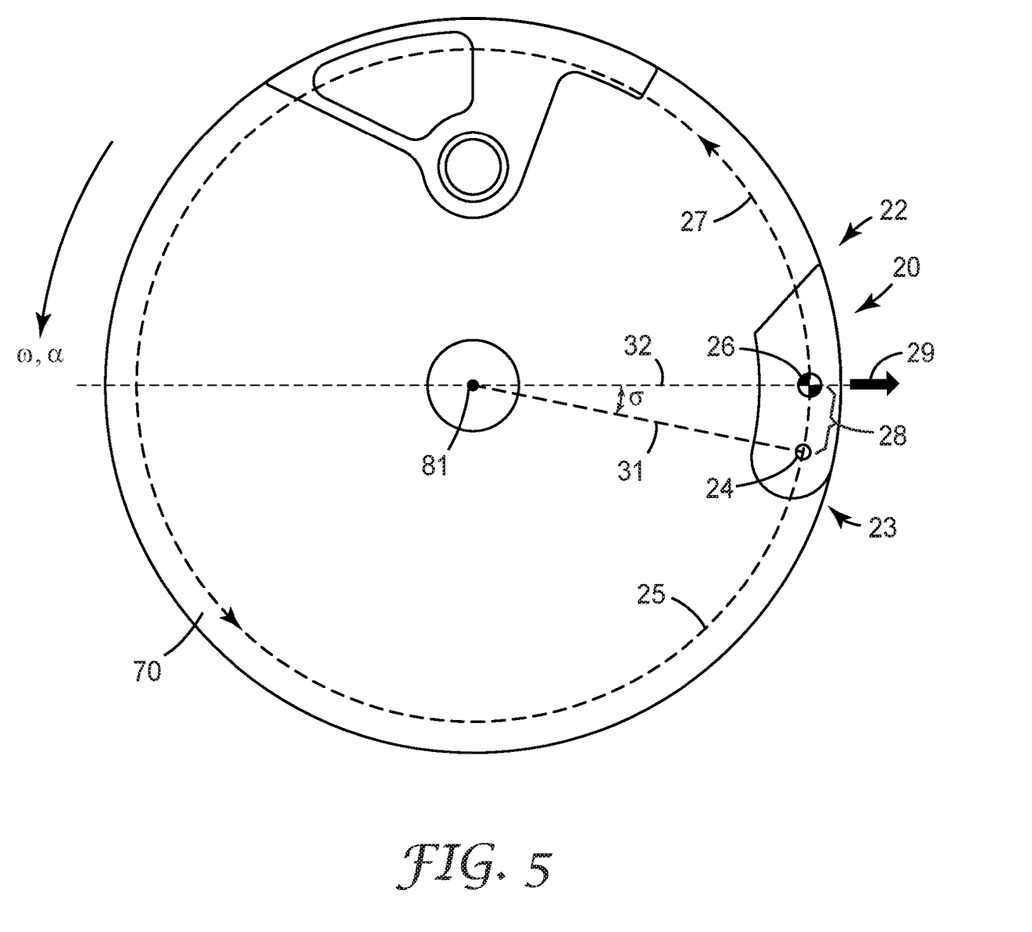
FIG. 5 is a simplified plan view of a velocity-actuated pawl.

The direction of rotation of various components (e.g. drum 80, pawl-support plate 70, and other items) in the instance that drum 80 turns rapidly in the event of a user fall, is denoted in various Figures herein by an arcuate arrow labeled w. (Discussions herein will make it clear that these items can sometimes rotate in the opposite direction; however, the particular direction of fall-induced rotation will be used in order to standardize terms used herein.) Terms such as "leading" and "trailing" are used to characterize the relative position of various items that travel along a generally circumferential pathway in the event of the above-described rotation. "Leading" refers to a component that, upon such rotation, passes a fixed point before a "trailing" component passes the fixed point. In other words, end 22 of pawl 20 as shown in FIG. 5, is a leading end; end 23 is a trailing end of pawl 20. In some instances, a "leading" direction and a "trailing" direction will be respectively referred to herein as a circumferentially-forward direction and a circumferentially-rearward direction. The meanings of all of these terms, and related terms and phrases, will be readily apparent based on the descriptions and Figures presented herein.

As used herein as a modifier to a property or attribute, the term "generally", unless otherwise specifically defined, means that the property or attribute would be readily recognizable by a person of ordinary skill but without requiring a high degree of approximation (e.g., within +/−20% for quantifiable properties). The term "substantially", unless otherwise specifically defined, means to a high degree of approximation (e.g., within +/−10% for quantifiable properties). The term "essentially" means to a very high degree of approximation (e.g., within plus or minus 2% for quantifiable properties; it will be understood that the phrase "at least essentially" subsumes the specific case of an "exact" match. However, even an "exact" match, or any other characterization using terms such as e.g. same, equal, identical, uniform, constant, and the like, will be understood to be within the usual tolerances or measuring error applicable to the particular circumstance rather than requiring absolute precision or a perfect match. The term "configured to" and like terms is at least as restrictive as the term "adapted to", and requires actual design intention to perform the specified function rather than mere physical capability of performing such a function. All references herein to numerical parameters (dimensions, ratios, and so on) are understood to be calculable (unless otherwise noted) by the use of average values derived from a number of measurements of the parameter.

DETAILED DESCRIPTION

Disclosed herein is a fall-protection apparatus, by which is meant an apparatus that acts to controllably decelerate a human user of the apparatus in the event of a user fall. By definition, such a fall-protection apparatus is a non-motorized apparatus. By this is meant that a safety line of the apparatus is not moved (i.e., extended or retracted from a housing of the apparatus) by way of an electrically powered motor; in other words, the apparatus is not used as part of a system (e.g., an elevator, a hoist, etc.) that uses one or more motors to raise or lower a load.

In many embodiments, such a fall-protection apparatus may be a self-retracting lifeline (SRL); i.e., a deceleration apparatus comprising a housing at least partially contains a drum-wound safety line that can be extended from the housing and retracted into the housing under slight tension during normal movement of a human user of the apparatus, and which, upon the onset of a user fall, automatically arrests (i.e., slows to a controlled rate, or completely stops) the fall of the user. Such an apparatus may comprise a safety line that can be extended out of a lower end of the apparatus with the apparatus having an upper, anchorage end which may be connected e.g. to a secure anchorage of a workplace. Often, such an apparatus may comprise a drum that is rotatably mounted within a housing therein such that such that the safety line can be wound about the drum when the line is retracted into the housing. Such an apparatus will further comprise a rotationally-activated braking device. By this is meant a device that is configured to slow (e.g. stop) the rotation of the drum upon rotation of the drum with a velocity above a predetermined threshold value of velocity, and/or upon the drum rotating with an acceleration above a predetermined threshold value of acceleration, as discussed in detail herein.

Figure 1:
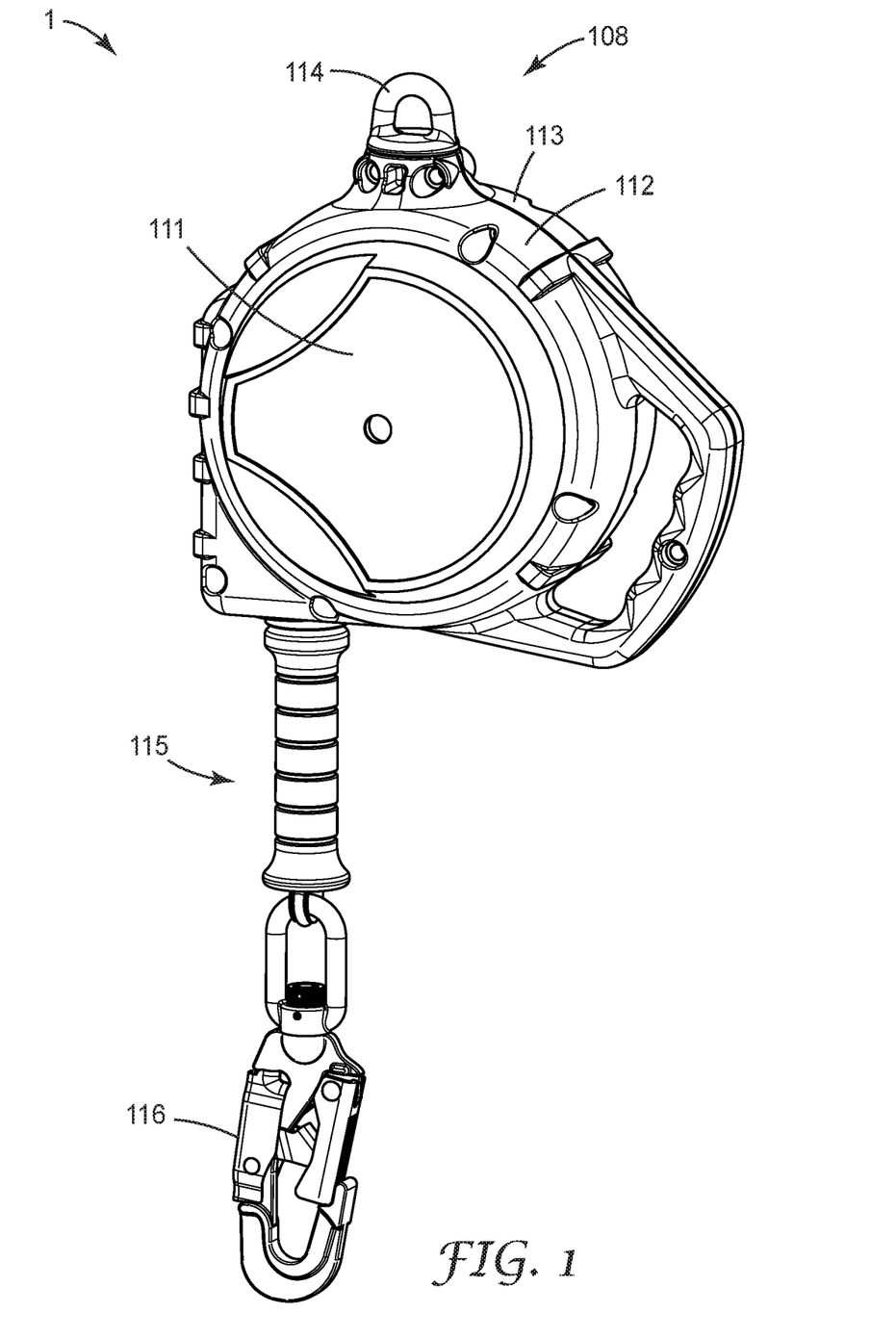
FIG. 1 is a perspective view of an exemplary fall-protection apparatus.

An exemplary fall-protection apparatus (a self-retracting lifeline) 1 is depicted in FIG. 1. Such an apparatus may comprise a housing 111 that is provided e.g. from a first housing piece 112 and second housing piece 113 that are assembled and fastened together to form the housing. Housing pieces 112 and 113 may be fastened together e.g. by bolts or by any other suitable fasteners. Various ancillary components such as e.g. one or more nuts, bolts, screws, shafts, washers, bushings, gaskets, bearings, labels, auxiliary housing pieces or shields, and the like, are omitted from the Figures herein for ease of presentation of components of primary interest; ordinary artisans will readily appreciate that any such items may be present as needed for the functioning of apparatus 1. In some embodiments, housing 111 may be load-bearing; in some embodiments, a load bracket or similar component may be present and may provide at least a portion of the load-bearing path of the apparatus.

Further details of exemplary apparatus 1 are depicted in FIG. 2, which is a partially exploded view with the second housing piece 113 omitted. Within an interior space at least partially defined by housing 111 is a drum 80, upon which is wound (e.g., spiral-wound) a length of safety line 115 (with the term line broadly encompassing any elongate, windable load-bearing member, including e.g. webbing, cable, rope, etc., made of any suitable synthetic or natural polymeric material, metal, etc., or any combination thereof). A proximal end of line 115 is connected, directly or indirectly, to drum 80 (such a connection encompasses configurations in which the proximal end of line 115 is connected to a shaft 82 on which drum 80 is mounted). Drum 80 is rotatably mounted within housing 111, e.g. by being rotatably mounted on a shaft 82 and/or by being mounted on a shaft 82 that is rotatable relative to the housing. A biasing member (not visible in any figure herein), which may be e.g. a suitable spring such as a spiral-coiled torsion spring, may be provided, which serves to bias the drum toward rotating in a direction that will retract safety line 115 onto the drum unless the biasing force is overcome e.g. by movement of a human user.

Apparatus 1 comprises a rotationally-activated braking device 10, as shown in exemplary embodiment in FIG. 2. Such a rotationally-activated braking device relies on one or more first pawls 20, and one or more second pawls 50. The at least one first pawl 20 is velocity-actuated; the at least one second pawl 50 is acceleration-actuated, as discussed in detail later herein. Typically, pawls 20 and 50 are co-rotatable with drum 80. By this is meant that the pawls are able to rotate along with drum 80, with the pawls moving in an orbital path about a center of orbital motion that coincides with the axis of rotation of the drum. In the illustrated embodiment of FIG. 2, such an arrangement is achieved by mounting first pawls 20 and second pawls 50 on a pawl-support plate 70, which is mounted on the same shaft 82 on which drum 80 is mounted. In other words, in at least some embodiments pawl-support plate 70 is axially co-mounted with drum 80 and is co-rotatable with drum 80 (meaning that plate 70 will rotate in unison with drum 80). In some embodiments pawl-support plate 70 may be attached directly to drum 80. In some embodiments, such an arrangement may be achieved by mounting such pawls directly on drum 80, e.g. so that a side flange or wall of drum 80 serves as a pawl-support plate.

In many embodiments, the one or more pawls 20, and the one or more pawls 50, are pivotally arranged (e.g. pivotally mounted on a pawl-support plate 70) so that they can pivotally move between a disengaged position and an engaged position. The pawls 20 and 50 will be biased so that in ordinary use of the fall-protection apparatus, an engaging end 22 or 52 of a pawl 20 or 50 is urged into a non-engaged position in which it does not engage with any component (e.g. a ratchet tooth) that would limit the rotation of the drum. In the depicted embodiment, this is performed by use of biasing members (springs) 21 and 51, as seen most easily in FIGS. 3 and 4; however, any suitable biasing mechanism or element can be used. The biasing of the pawls into a non-engaged position allows the drum to rotate freely thus allowing extension and retraction of the safety line in response to movements of a human user of the fall-protection apparatus as the user goes about their workplace activities. In the event that the drum begins to rotate above a predetermined threshold value of velocity or acceleration, at least one pawl 20 or 50 is motivated (overcoming the biasing force of spring 21 or 51) into an engaged position in which the engaging end 22 or 52 of the pawl is able to physically contact a tooth of a ratchet to slow and/or stop the rotation of the drum. An exemplary ratchet 90 and teeth 91 thereof are depicted in exemplary embodiment in FIG. 7; however, it will be appreciated that many ratchet arrangements are possible, as is discussed in detail later herein. Strictly speaking, a pawl will not "engage" with a ratchet tooth until its engaging end actually contacts the tooth. However, for purposes of description, a pawl will be considered to be in an engaged position upon the pawl having been actuated so that its engaging end is in a position (e.g. having moved radially outward) in which it will contact a ratchet tooth upon continued motion of the pawl along its orbital path.

In various Figures herein, some pawls are depicted in an engaged position while others are depicted in a disengaged position. For clarity, in various Figures herein a pawl that is in an engaged position is subscripted "e" (e.g. $20_e$ or $50_e$) while a pawl that is in a disengaged position is subscripted "d" (e.g. $20_d$ or $50_d$). The presentation of pawls in these different positions is done in order to illustrate these positions and the differences therebetween. It will be appreciated that when the apparatus is in a non-fall situation (e.g. with the drum rotating very slowly or not at all), all such pawls will typically be in a disengaged position. Various numerical relationships and calculations that are presented later herein, will be understood to be obtained with apparatus 1 in a condition in which all such pawls are in a nominal, fully disengaged position. In some embodiments, one or more physical stops may be provided e.g. on an adjacent surface of the pawl-support plate, so that the biasing causes each pawl to be "snugged" against the physical stop, e.g. in a fully disengaged position.

In use of a rotationally-activated braking device as disclosed herein, engaging of at least one pawl with a tooth of a ratchet will at least slow, e.g. will arrest, the rotation of the drum. With some such braking devices, the rotationally-activated braking device may bring the drum to a "hard stop" in which the rotation of the drum ceases the instant that the pawl engages the tooth. In many such cases, the safety line of such an apparatus may include a so-called shock absorber (e.g. a tear web or tear strip) to minimize the force experienced by a human user as the user is brought to a halt. (It will be understood that the term "hard stop" is used for convenience in distinguishing such a stop from a more gradual stop that relies on the use of a friction brake as described later herein; the term "hard stop" does not imply that the user is subjected to, e.g., excessively hard forces in being brought to a halt.) With some other such braking devices (e.g. as depicted in the Figures herein), the rotationally-activated braking device relies on a friction brake that, rather than bringing the drum instantly to a "hard stop", brings the drum to a halt in a more gradual manner as described in detail later herein. This can minimize the force experienced by a human user as a fall is being arrested, e.g. without necessarily requiring the presence of a shock absorber in the safety line.

In use of exemplary fall-protection apparatus 1, an upper, anchorage end 108 of the apparatus may be connected (e.g. by way of connection feature 114) to a secure anchorage (fixed point) of a workplace structure (e.g., a girder, beam or the like). The distal end of line 115 may then be attached (e.g., by way of hook 116) to a harness worn by a worker. As the human user moves away from the fixed anchorage, drum 80 rotates in a first direction so that line 115 is extended (paid out) from within housing 111. As the user moves toward the fixed anchorage, drum 80 rotates in a second, opposite direction (e.g. under the urging of a torsion spring or other biasing member), so that line 115 is automatically self-retracted within housing 111 and wound upon drum 80. During such user activities, pawls 20 and 50 are biased by the aforementioned biasing elements 21 and 51 so that an engaging end 22 or 52 of a pawl 20 or 50 does not engage a tooth 91 of a ratchet 90 of the rotationally-activated braking device. In the event that the human user falls and causes line 115 to begin rapidly extending from housing 111, an engaging end 22 or 52 of a pawl 20 or 50 is caused to move (i.e., is actuated) to a position in which it can engage with a ratchet tooth by the arrangements disclosed herein, whereupon the falling of the worker is arrested as discussed in detail herein.

Velocity-Actuated Pawls and Acceleration-Actuated Pawls

As disclosed herein, a fall-protection apparatus 1 comprises at least one first pawl 20 that is a velocity-actuated pawl, and at least one second pawl 50 that is an acceleration-actuated pawl. In many embodiments, the at least one first pawl 20 and the at least one second pawl 50 may be mounted on a common pawl-support plate 70, as in the exemplary design of FIGS. 2-4 (noting that in some embodiments a sidewall or flange of drum 80 may serve as a pawl-support plate rather than a separate pawl-support plate 70 being used in the manner of FIG. 2). As shown in exemplary embodiment in FIGS. 2-4, in some embodiments the at least one first, velocity-actuated pawl 20 may take the form of a pair of pawls 20. In some embodiments the pawls 20 of such a pair may be located in circumferentially-opposing positions from each other (i.e., on opposite sides of the axis of rotation 81 of drum 80 and pawl-support plate 70, when viewed along axis of rotation 81) as in the exemplary design of FIG. 4.

Similarly, in some embodiments the at least one second, acceleration-actuated pawl 50 may take the form of a pair of pawls 50. In some embodiments the pawls of such a pair of second pawls 50 may be located in circumferentially-opposing positions from each other, as in FIG. 4. In some embodiments, the velocity-actuated pawls 20 and the acceleration-actuated pawls 50 may be circumferentially spaced along a circular path along the pawl-support plate (again, when viewed along the axis of rotation of the pawl-support plate) with each pawl 20 being circumferentially between two pawls 50, and with each pawl 50 being circumferentially between two pawls 20, again as shown in FIG. 4.

Figure 4:
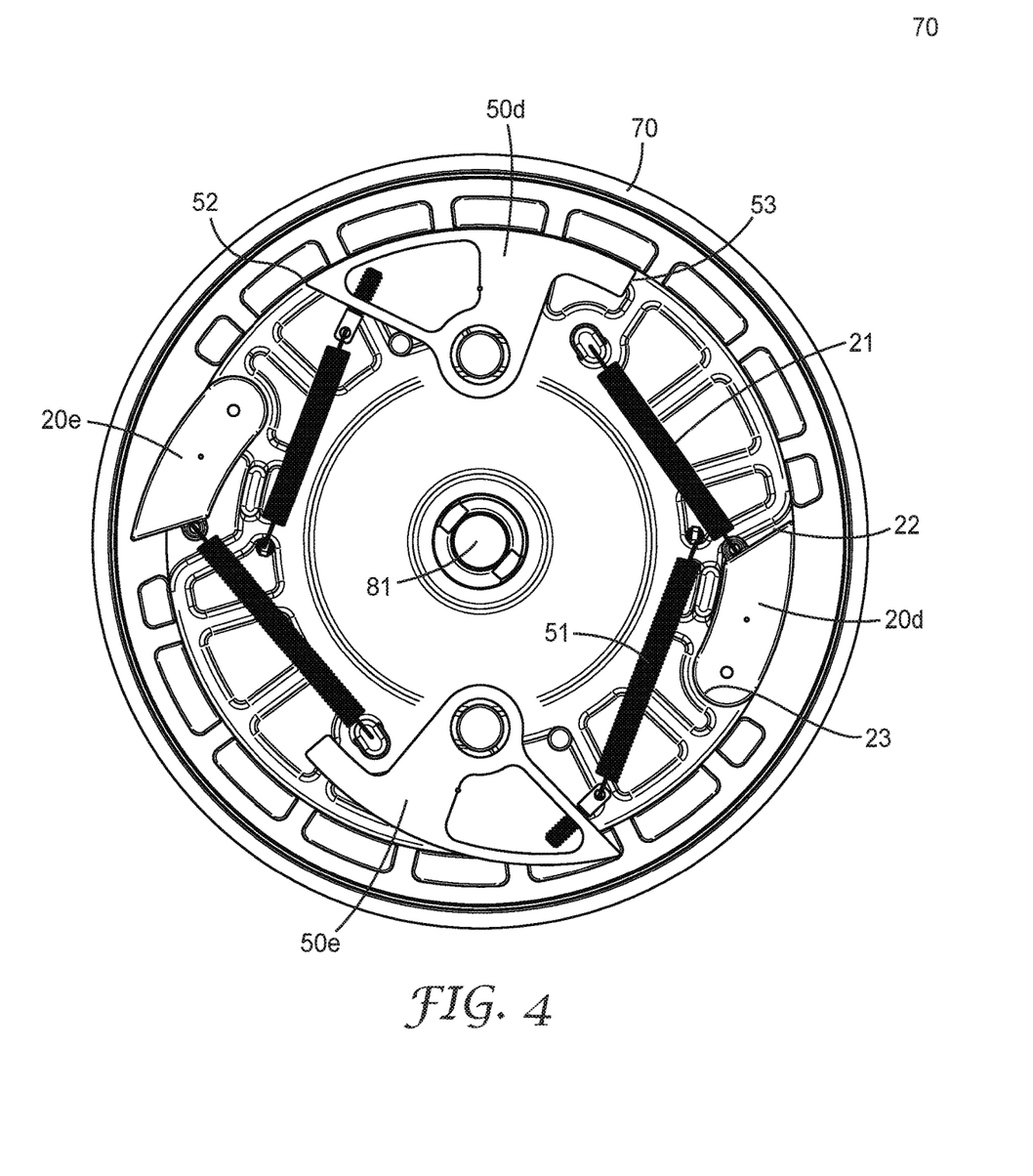
FIG. 4 is a plan view of velocity-actuated pawls and acceleration-actuated pawls and various components associated therewith.

As is evident from the view of FIG. 4, the at least one first pawl 20 and the at least one second pawl 50 are configured so that upon rotation of pawl-support plate 70 around its axis of rotation 81, first pawl(s) 20 and second pawl(s) 50 will follow a generally circular orbital path around axis of rotation 81. When drum 80 and pawl-support plate 70 are rotating at a velocity and acceleration below the respective threshold values of velocity and acceleration of pawls 20 and 50 (as discussed in detail below), all of the pawls will be in a first, disengaged position. When drum 80 and pawl-support plate 70 are stationary (meaning not rotating about axis 81), all such pawls will typically be in a fully disengaged position, meaning that they are urged as far in the disengaging direction as they can be moved by their respective biasing members.

A velocity-actuated pawl 20 is a pawl that is actuated (i.e., caused to move from a first, disengaged position, toward, and e.g. to, a second, engaged position) when the velocity of the pawl 20 along its orbital path exceeds a predetermined threshold value. For convenience, this velocity will be referred to herein as rotational velocity. This will be understood to refer to the velocity of a pawl along its orbital path as dictated by the rotation of the pawl-support plate; this does not refer to any (partial) rotation of the pawl relative to the pawl-support plate (about a pivot point at which the pawl is pivotally connected to the pawl-support plate). By definition, a velocity-actuated pawl 20 is not significantly actuated by any acceleration that the pawl may be experiencing, as discussed in detail later herein.

An acceleration-actuated pawl 50 is a pawl that is caused to move from its first, disengaged position, toward a second, engaged position, when the acceleration of the pawl 50 along its orbital path exceeds a predetermined threshold value. By definition, an acceleration-actuated pawl 50 is not significantly actuated by the absolute value of the velocity that the pawl may be experiencing.

In other words, a velocity-actuated pawl 20 will be actuated upon the rotational velocity of the pawl exceeding a certain threshold value, essentially regardless of the acceleration that exists when that threshold value of velocity is reached, and essentially regardless of the particular acceleration history that was experienced by the pawl in reaching that threshold value of velocity. Similarly, an acceleration-actuated pawl 50 will be actuated upon the acceleration of the pawl exceeding a certain threshold value, essentially regardless of the absolute value of the velocity that exists when that threshold value of acceleration is reached, and essentially regardless of what velocity may or may not have been experienced by the pawl prior to reaching that threshold value of acceleration. The first pawl(s) 20 and the second pawl(s) 50 are thus independently actuated, by separate mechanisms, one based on velocity, one based on acceleration.

Independence of Velocity-Actuated Pawls and Acceleration-Actuated Pawls

By the first pawl(s) 20 and the second pawl(s) 50 being independently functioning is meant that the functioning of a first pawl 20 is not significantly affected by the functioning of a second pawl 50, and vice versa. This means that the threshold velocity at which a first pawl 20 is actuated is not significantly affected by any acceleration that is, or has been, experienced by the first pawl 20, as explained above. Beyond this, this also means that the threshold velocity of a first pawl 20 is not significantly affected by any change in position (actuation) that a second pawl 50 may have undergone, or be undergoing, in response to any acceleration experienced by the second pawl 50. Similarly, the threshold acceleration of a second pawl 50 is not significantly affected by any change in position (actuation) that a first pawl 20 may have undergone, or be undergoing, in response to any velocity experienced by the first pawl 20.

In other words, the velocity-response of a first pawl 20 is not significantly affected by the acceleration-response of a second pawl 50, and vice-versa. The velocity threshold of a first pawl 20 and the acceleration threshold of a second pawl 50 can thus be set independently of each other. Such an arrangement is distinguished from art arrangements in which, for example, the velocity threshold of a first pawl is altered by an actuation experienced by a second (e.g. acceleration-actuated) pawl. In such cases in the art, the actuation threshold of an apparatus may reflect a combination of the velocity and acceleration experienced by the pawl(s) of the apparatus. In contrast, in the arrangements disclosed herein, the two types of pawls (velocity-actuated and acceleration-actuated) function independently, and have actuation thresholds that can be set independently.

In the above discussions, terms such as "not significantly affected", "essentially regardless", and similar terminology, imply that less than 20% of the actuation of a first, velocity-actuated pawl will result from any acceleration experienced by the pawl. (Such values can be calculated e.g. in terms of the centrifugal force on the pawl resulting from rotational velocity, in comparison to the force resulting from acceleration of the pawl along the rotational path, as will be made clear in later discussions herein.) Such terms also imply that the velocity threshold of a first, velocity-actuated pawl will be affected less than 20% by the position of a second, acceleration-actuated pawl. That is, the velocity threshold of the first pawl will not go up or down more than 20% regardless of the position of the second pawl. Correspondingly, such terms also imply that less than 20% of the actuation of a second, acceleration-actuated pawl will result from the (absolute) rotational velocity of that pawl; and, that the acceleration threshold of a second pawl will be affected less than 20% by the position of a first, velocity-actuated pawl.

In further embodiments, these parameters, for both types of pawls, may be less than 15, 10, 5, 2, or 1%.

It will be understood that the above-discussed conditions apply only until any pawl is actuated into an engaged position sufficient to actually encounter a ratchet tooth. Once any pawl actually contacts a ratchet tooth, the motion of all other pawls will typically be very significantly affected. For example, the actuation of an acceleration-actuated pawl into an engaged position may have the result that a velocity-actuated pawl that would otherwise have become engaged had the velocity continued to increase, may instead not become engaged. Such a circumstance is readily understandable by ordinary artisans and does not conflict with the condition that the velocity-actuated pawl(s) and the acceleration-actuated pawl(s) are independent in the manner described above.

It will thus be appreciated that the arrangements disclosed herein can allow the velocity threshold that is set for a velocity-actuated pawl, and the acceleration threshold that is set for an acceleration-actuated pawl, to be chosen independently. This independence of the action of one or more velocity-actuated pawls and the action of one or more acceleration-actuated pawls, will have advantages that are readily appreciated by ordinary artisans.

As will be appreciated from e.g. FIG. 4, in some embodiments a first, velocity-actuated pawl 20 can be biased toward a first, disengaged position, by way of a biasing spring 21. In the depicted embodiment, spring 21 is a coil spring that is acting in tension. Exceeding a predetermined rotational velocity threshold will cause pawl 20 to overcome the biasing force of spring 21 so as to move toward a second, engaged position, as discussed in detail herein. Similarly, a second, acceleration-actuated pawl 50 can be biased toward a first, disengaged position, by way of a tensioned coil spring 51 as shown in FIG. 4. Exceeding a predetermined acceleration threshold will cause pawl 50 to overcome the biasing force of spring 51 so as to move toward a second, engaged position. FIG. 4 shows one first pawl $20_d$ that is in a disengaged position and another first pawl $20_e$ that is in an engaged position; and, one second pawl $50_d$ that is in a disengaged position and another second pawl $50_e$ that is in an engaged position. This is done purely for the purpose of illustrating the various positions that the pawls can be in; it does not, for example, imply that if any pawl 20 is in an engaged position then a pawl 50 must also be in an engaged position, or vice versa.

It will be appreciated that any suitable biasing item, member, mechanism, etc. may be used. For example, a biasing spring that is acting in compression rather than tension may be used. Or, a torsion spring may be used. In some embodiments, a magnetic biasing mechanism may be used, e.g. by way of mounting one or more magnets in suitable locations on pawl-support plate 70 and/or on one or more pawls.

In many embodiments, any or all such pawls 20 and/or 50 may be pivotally mounted on (e.g. pivotally attached to) pawl-support plate 70 at a pivot point. Methods of achieving such arrangements will be readily understandable to ordinary artisans and need not be explored in further detail herein. Moreover, it will be appreciated that a system of pawls of the general type disclosed herein may include various ancillary components, features and arrangements. These may include e.g. physical stops to limit the motion of a pawl toward a disengaged position (i.e. to set the configuration of a fully-disengaged position), support posts or the like to which biasing members such as springs can be fastened, and so on. Ordinary artisans will be easily able to configure such ancillary features.

Velocity-Actuated Pawls

The functioning of velocity-actuated pawls will be discussed in reference to FIG. 5, which is a simplified representation of a pawl-support plate 70 bearing an exemplary velocity-actuated pawl 20 (shown in a disengaged position). Various features and components (e.g. biasing springs and so on) are omitted from FIG. 5 for ease of presentation of the features of pawl 20.

As mentioned earlier herein, velocity-actuated pawl 20 is biased so that the engaging end 22 of pawl 20 is urged toward (e.g. maintained in) a disengaged position. Upon rotation of the rotatable drum above a predetermined threshold of rotational velocity (w), engaging end 22 of pawl 20 is urged away from the disengaged position and into an engaged position in which it engages a tooth of the ratchet. In arrangements of the general type shown in FIG. 5, engaging end 22 will move radially outward in moving from a disengaged position to an engaged position.

Pawl 20 comprises a pivot point 24 that is aligned with (and defined by) a pivotable connection of pawl 20 with pawl-support plate 70. Pivot point 24 is generally proximate the "trailing" end 23 of pawl 20, which is the end opposite engaging end 22, which is the "leading" end of pawl 20 as pawl plate 70 rotates (counterclockwise, in the depicted Figures). Pivot point 24 will follow an orbital path 25 as the drum (not shown) and pawl-support plate 70 rotate about axis of rotation 81. Pawl 20 also comprises a center of mass 26 that likewise follows an orbital path 27 as the drum and the pawl-support plate rotate about axis of rotation 81.

In a velocity-actuated pawl 20, center of mass 26 and pivot point 24 are at least generally radially aligned with each other (in other words, center of mass 26 and pivot point 24 are at least generally the same radial distance from axis of rotation 81). By this is meant that center of mass 26, and pivot point 24, are positioned so that the orbital path 27 followed by center of mass 26, and the orbital path 25 followed by pivot point 24, at least generally coincide. In the exemplary depiction of FIG. 5, orbital paths 25 and 27 coincide exactly; however, this is not necessarily required, as discussed below.

As indicated in FIG. 5, the center of mass 26 of pawl 20 is circumferentially offset from pivot point 24 of pawl 20, along the orbital path 27/25 of center of mass 26/pivot point 24. This circumferential offset along orbital path 27/25 is indicated by bracket 28. As pawl-support plate 70 rotates about axis 81, a radially-outward centrifugal force (indicated by block arrow 29) will develop. The offset between this force and the pivot point 24 of the pawl will have the effect that pawl 20 will rotate about pivot point 24 so that center of mass 26 moves generally radially outward, approximately in the direction indicated by block arrow 29. Engaging end 22, being on the opposite side of center of mass 26 from pivot point 24, will move radially outward to an even greater extent.

Thus, a rotational velocity of plate 70 above a predetermined threshold will cause engaging end 22 of pawl 20 to be urged generally radially outward toward, and eventually into, an engaged position. The value of this threshold can be set partially by the above-discussed biasing force that is applied to pawl 20, but will typically also be affected by various parameters (e.g. mass, mass distribution, and so on) of pawl 20.

The fact that center of mass 26 and pivot point 24 are at least generally radially aligned with each other means that center of mass 26 at least generally follows the same orbital path as pivot point 24. This has the effect that any acceleration (i.e. a change in the absolute rotational velocity) of pawl 20 will have little or no tendency to urge the center of mass, or the engaging end 22, of pawl 20, either generally radially outward or inward. Pawl 20 is thus responsive to the absolute rotational velocity of pawl 20 along its orbital path, but is not significantly responsive to acceleration along this orbital path.

The above explanations have been couched partly in terms of "centrifugal force" acting to urge the center of mass 26 of pawl 20 generally radially outward. Ordinary artisans will understand that, strictly speaking, centrifugal force is a fictitious or "pseudo" force. What actually occurs is that the inertia of center of mass 26 tends to cause center of mass 26 to deviate radially outward (i.e., to attempt to continue in a straight path) rather than following arcuate orbital path 27. However, the concept of centrifugal force is well-established and is perfectly suited for discussing the motion of a pawl 20 using a frame of reference that rotates with pawl-support plate 70 and pawl 20. So, for convenience of description, the term centrifugal force is used in the discussions herein.

The circumferential offset between center of mass 26 and pivot point 24, along orbital paths 25/27, can be any suitable value. Such an offset may be characterized e.g. by way of an offset angle (angular arc) σ measured from a vertex that coincides with axis of rotation 81, as indicated in FIG. 5. That is, angle σ is the included angle between imaginary lines 31 and 32 that respectively extend from pivot point 24 to axis of rotation 81, and from center of mass 26 to axis of rotation 81. In various embodiments, such an angular arc may be at least 1, 2, 4, 6, 8, or 10 degrees. In further embodiments, such an angular arc may be at most 20, 18, 16, 14 or 12 degrees. By way of a specific example, the circumferential offset angle σ shown in the exemplary design of FIG. 5, is approximately 12 degrees. In some instances, such an offset may be characterized by the distance between center of mass 26 and pivot point 24, the distance being measured along (arcuate) orbital path 27 of center of mass 26. In various embodiments, such a distance may be at least 1, 2, 4, or 8 mm; in further embodiments, such a distance may be at most 50, 20, 15, or 10 mm.

It may not be necessary for pivot point 24 and center of mass 26 to be "exactly" radially aligned with each other (that is, it may not be necessary that orbits 25 and 27 must coincide "exactly") in order to provide that a velocity-actuated pawl 20 is not significantly actuated by acceleration. That is, in any real-life apparatus, small adjustments may be made in view of the fact that, for example, pivot point 24 may not be a geometrically perfect point, frictional effects may occur, gravitational effects may occur, inertial effects may occur (e.g. due to the mass of pawl plate 70 and/or the mass of drum 80 and any safety line 115 wound thereon), and so on. So in some instances, it may be acceptable, or even desirable, that there be a deliberate (although typically small) mismatch between orbits 25 and 27. Thus the condition is applied as stated above, that pivot point 24 and center of mass 26 are "at least generally" radially aligned with each other. By this is meant that the orbital path 27 of center of mass 26 exhibits a diameter that differs from the diameter of orbital path 25 of pivot point 24, by less than plus or minus 10%. In various embodiments, the orbital path 27 of center of mass 26, may exhibit a diameter that is within plus or minus 8, 5, 3, 2, 1, or 0.5% of the diameter of orbital path 25 of pivot point 24. Any such measurement will be performed with pawl plate 70 stationary and with pawl 20 in a fully disengaged position. The diameter of orbital path 25 will be used as the reference basis (denominator) for the calculation of the above percentage.

Acceleration-Actuated Pawls

The functioning of acceleration-actuated pawls will be discussed in reference to FIG. 6, which is a simplified representation of a pawl-support plate 70 bearing an exemplary acceleration-actuated pawl 50 (shown in a disengaged position). Various features and components (e.g. biasing springs and so on) are omitted from FIG. 6 for ease of presentation of the features of pawl 50.

As mentioned earlier herein, acceleration-actuated pawl 50 is biased so that the engaging end 22 of pawl 20 is urged toward (e.g. maintained in) a disengaged position. Upon rotation of the rotatable drum above a predetermined threshold of acceleration (a), engaging end 52 of pawl 50 is urged away from the disengaged position into an engaged position in which it engages a tooth of the ratchet. In arrangements of the general type shown in FIG. 6, engaging end 52 moves radially outward in moving from a disengaged position to an engaged position.

Pawl 50 comprises a pivot point 54 that is aligned with (and defined by) a pivotable connection of pawl 50 with pawl-support plate 70. Pivot point 54 is generally proximate the "trailing" end 53 of pawl 50, which is the end opposite engaging end 52, which is the "leading" end of pawl 50 as pawl plate 70 rotates counterclockwise. Pivot point 54 will follow an orbital path 55 as the drum (not shown) and pawl-support plate 70 rotate about axis of rotation 81. Pawl 50 also comprises a center of mass 56 that likewise follows an orbital path 57 as the drum and the pawl-support plate rotate about axis of rotation 81.

Figure 6:
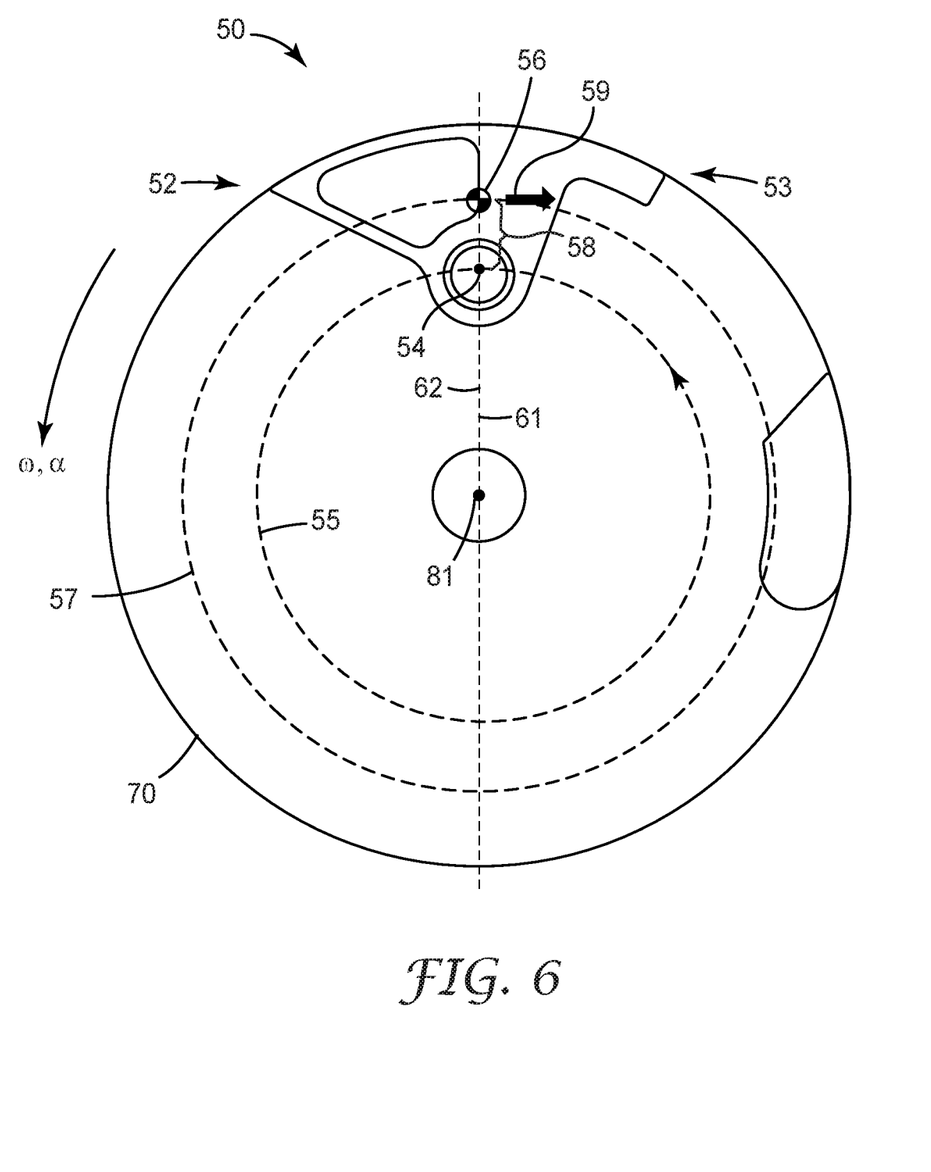
FIG. 6 is a simplified plan view of an acceleration-actuated pawl.

As indicated in FIG. 6, the center of mass 56 of pawl 50 is not circumferentially offset from pivot point 54 of pawl 50, along the orbital path 25 of center of mass 56. Rather, center of mass 56 and pivot point 54 are at least generally circumferentially aligned with each other. By this is meant that a line 61 that extends from the axis of rotation 81 of pawl-support plate 70 through pivot point 54, is at least generally coincident with a line 62 that extends from axis of rotation 81 through center of mass 56, as evident in FIG. 6. Pawl 50 thus differs from pawl 20 in this aspect.

Moreover, pawl 50 differs from pawl 20 in that in pawl 50, pivot point 54 and center of mass 56 are radially offset from each other, rather than being at least generally radially aligned with each other as in pawl 20. By radially offset is meant that the orbital path 57 of center of mass 56 exhibits a diameter that differs from the diameter of orbital path 55 of pivot point 54, by at least 10%. In various embodiments, center of mass 56 may exhibit a radial offset from pivot point 54 (i.e., the diameter of orbit 57 may differ from the diameter of orbital path 55) by at least 15, 20, 25 or 30%. In further embodiments, the orbital path 57 of center of mass 56 may exhibit a diameter that differs from the diameter of orbital path 55 of pivot point 54, by no more than 50, 45, 40, or 35%. Again, any such measurement will be performed with pawl plate 70 and with pawl 50 in a fully disengaged position. The radius of orbital path 55 will be used as the basis (denominator) for the calculation of the above percentage. By way of a specific example, the radial offset indicated by bracket 58 in FIG. 6, is approximately 34%.

In the specific radial-offset arrangement disclosed in FIG. 5, center of mass 56 is positioned radially outward from pivot point 54 (thus the diameter of orbital path 57 is greater than the diameter of orbital path 55). However, other arrangements are possible, as discussed later herein.

The above-described radial offset between pivot point 54 and center of mass 56 is indicated by bracket 58. If pawl-support plate 70 is accelerated in a direction indicated by arcuate arrow a in FIG. 6, a generally-circumferentially-rearward force (indicated by block arrow 59) will develop near the center of mass of pawl 50. The offset between this force vector and the pivot point 54 of the pawl will have the effect that pawl 50 will rotate about pivot point 54 so that center of mass 56 moves generally circumferentially rearward (in opposition to the rotary motion of plate 70), approximately in the direction indicated by block arrow 59. (It will be understood that these rearward motions are relative to pawl-support plate 70, notwithstanding that plate 70 is rotating forwardly and carrying pawl 50 along with it so that the overall orbital motion of pawl 50 may still be forward.)

The design of pawl 50 is such that this circumferentially rearward motion of center of mass 56 will cause engaging end 52 of pawl 50 to move generally radially outward (so that it can engage a ratchet tooth). Thus, acceleration of plate 70 along its orbit above a predetermined threshold will cause engaging end 52 of pawl 50 to be urged generally radially outward toward, and into, an engaged position. (The value of this threshold may be set partially by the above-discussed biasing force that is applied to pawl 50, but can also be affected by various parameters (e.g. mass, mass distribution, and so on) of pawl 50.)

The acceleration of plate 70 along its orbital path is thus the operative variable that affects the engaging of pawl 50. The fact that center of mass 56 is at least generally circumferentially aligned with pivot point 54, means that the absolute rotational velocity of plate 70 will have little or no tendency to urge the center of mass, or the engaging end 52, of pawl 50, either generally radially outward or inward. Pawl 50 is thus responsive to acceleration of pawl-support plate 70 along its orbital path, but is not significantly responsive to the absolute value of the rotational velocity along this orbital path. (In other words, there may be little or no effect of centrifugal force on pawl 50.)

The above explanations have been couched in terms of pawl 50 being responsive to "acceleration". This implies that in the absence of sufficient acceleration, pawl 50 will not be actuated. It is noted that, strictly speaking, a body (e.g. center of mass 56 of pawl 50) that is following an orbital path is continuously experiencing acceleration, due to the change in the direction of motion. (In other words, velocity is a vector quantity, and any change in the magnitude or direction of the velocity, corresponds to acceleration.) Those of ordinary skill will appreciate that the term "acceleration" as used herein (e.g. with regard to an acceleration-actuated pawl) specifically denotes so-called tangential acceleration of a body that is following an orbital path. (Such tangential acceleration will be generally aligned with the above-discussed arrow 59 as shown in FIG. 6.) In other words, the acceleration that causes actuation of a pawl 50 corresponds to a change in the magnitude of the velocity of a body along its orbital path. Acceleration that results merely from the body following an orbital path at constant velocity (i.e., centripetal acceleration) has little or no effect; the velocity of the body along this orbital path must change in order for acceleration-actuation of the type disclosed herein to occur.

In a pawl 50, it may not be necessary for pivot point 54 and center of mass 56 to be "exactly" circumferentially aligned (that is, it may not be necessary that the above-mentioned lines 61 and 62 must coincide "exactly"), in order to provide that an acceleration-actuated pawl 50 is not significantly actuated by velocity. That is, in any real-life apparatus, small adjustments may be made in view of the fact that, for example, pivot point 54 may not be a geometrically perfect point, frictional effects may occur, gravitational and/or inertial effects may occur, and so on. So in some instance, it may be desirable that there be a deliberate, albeit small, mismatch between lines 61 and 62. Thus the condition is applied as stated above, that pivot point 54 and center of mass 56 are "at least generally" circumferentially aligned with each other. By this is meant any included angle between lines 61 and 62 will exhibit an angular arc of less than 10 degrees. In various embodiments such an included angle will be less than 8, 6, 4, 2 or 1 degrees.

The above discussions have presented arrangements in which a pawl 20 is velocity-actuated, while exhibiting little or no direct response to acceleration; and, in which a pawl 50 is acceleration-actuated, while exhibiting little or no response to velocity. In brief summary, the former can be achieved by providing a pawl with a center of mass that is radially aligned with, and circumferentially offset from, the pawl's pivot point. Conversely, the latter can be achieved by providing a pawl with a center of mass that is circumferentially aligned, and radially offset, from the pawl's pivot point. As noted above, these relationships need not be "exact". In fact, ordinary artisans will appreciate that, for example, when a velocity-actuated pawl has moved (e.g. radially outward) toward an engaged position, the center of mass will no longer be as radially aligned with the pivot point as it was when the pawl was in the fully disengaged position. Thus after a velocity-actuated pawl has moved out of its fully disengaged position, it may be slightly more affected by acceleration. Similarly, when an acceleration-actuated pawl has moved (e.g. circumferentially rearward) toward an engaged position, the center of mass will no longer be as circumferentially aligned with the pivot point as it was when the pawl was in the fully disengaged position. Thus after an acceleration-actuated pawl has moved out of its fully disengaged position, it may be slightly more affected by absolute velocity.

Ordinary artisans will appreciate that any such effects will be transient in nature (e.g., only coming into play when a pawl is already well on its way to an engaged position). Moreover, the present work has indicated that with pawls designed and arranged in the general manner disclosed herein, any such phenomena will be rather small in magnitude (e.g. insignificant).

The value of velocity that causes a pawl 20 to be actuated can be set as desired. Such a velocity threshold may be set to any suitable nominal value, e.g. 6, 8, or 10 feet per second. Such a nominal value will correspond to the linear velocity experienced by the extended portion of safety line 115 (and thus to a user connected thereto). This can be converted to an actual value of rotational velocity of pawl 20 in view of the specific design parameters of the fall-protection apparatus (e.g. the diameter of the drum from which the safety line is unwound, the diameter of the orbit of the pawl, and so on). This can be used to set particular parameters (e.g. the spring constant of a biasing spring, and so on) to ensure that pawl 20 is actuated at a rotational velocity that corresponds to the desired threshold of velocity experienced by the user.

Similarly, the value of acceleration that causes a pawl 50 to be actuated can be set as desired. Such an acceleration threshold may be set to any suitable nominal value, e.g. 0.6 to 0.8 g. Such a nominal value will correspond to the linear acceleration experienced by the extended portion of safety line 115 (and thus to a user connected thereto). This can be converted to an actual value of acceleration of pawl 50 in view of the specific design parameters of the fall-protection apparatus. This can be used to set particular parameters (e.g. the spring constant of a biasing spring, and so on) that ensure that pawl 50 is actuated at a rotational acceleration (specifically, a tangential acceleration) that corresponds to the desired threshold of acceleration experienced by the user.

FIGS. 4 and 5 illustrate exemplary arrangements in which both velocity-actuated pawls 20, and acceleration-actuated pawls 50, are configured so that the engaging end of the pawl moves radially outward as the pawl is actuated toward an engaging position. (Such arrangements are typically used in combination with a radially-inward-facing ratchet as discussed below.) In other embodiments, a velocity-actuated pawl 20 may be configured so that the engaging end of the pawl moves radially inward as the pawl is actuated toward an engaging position. This may be achieved by, for example, positioning the center of mass of the pawl on the opposite side of the pivot point from the engaging end. In some embodiments, an acceleration-actuated pawl 50 may be configured so that the engaging end of the pawl moves radially inward as the pawl is actuated toward an engaging position. This may be achieved by, for example, positioning the center of mass of the pawl radially inward of the pivot point. Arrangements in which one or more velocity-actuated pawls, and/or one or more acceleration-actuated pawls, are radially-inwardly-actuating, can be used in combination with a radially-outward-facing ratchet as discussed below. Given the disclosures and design guidance presented herein, an ordinary artisan will be able to design a velocity-actuated pawl and/or an acceleration-actuated pawl that is radially-inward-actuating.

Other variations are possible. For example, in some embodiments a circumferentially-opposing pair of like pawls (e.g. two acceleration-actuated pawls, or two velocity-actuated pawls) could be configured so as to be operatively connected to each other. Such connection might be e.g. by way of one or more rigid connecting rods (e.g. push-pull rods) or a tensioned belt, e.g. in the form of an endless loop that wraps around a pivot-point-coincident post of both pawls. Such a connection can couple the pair of pawls together so that they move (e.g. from a disengaged position, toward an engaged position) essentially in unison. In some embodiments, this may enhance performance of the apparatus by minimizing any differential effects due to e.g. gravity.

A fall-protection apparatus as described herein may comprise a housing, drum, rotationally-activated braking device, etc., of any desired size. In some embodiments, the apparatus may be sized so that it can serve as a so-called "personal" self-retracting lifeline as discussed later herein. The size of the rotationally-activated braking device may be characterized e.g. in terms of the diameter of the orbital pathway 25 that is followed by the pivot point 24 of the velocity-actuated pawl(s) 20. In various embodiments, the diameter of orbital path 25 may be at least 20, 30, 40, or 50 mm; in further embodiments, the diameter of orbital path 25 may be at most 150, 120, 90, or 60 mm.

The above-discussed items may be made of any suitable material. For example, in some embodiments pawls 20 and/or 50 may be made of a metal such as steel. A pawl-support plate 70 may likewise be made of e.g. steel. A drum 80 may be made of e.g. a molded polymeric material such as e.g. glass-fiber-reinforced nylon, or a metal such as e.g.

cast aluminum. Springs 21 and/or 51 may be made of e.g. any suitable material, e.g. stainless steel, zinc-coated steel, etc.

Figure 7:
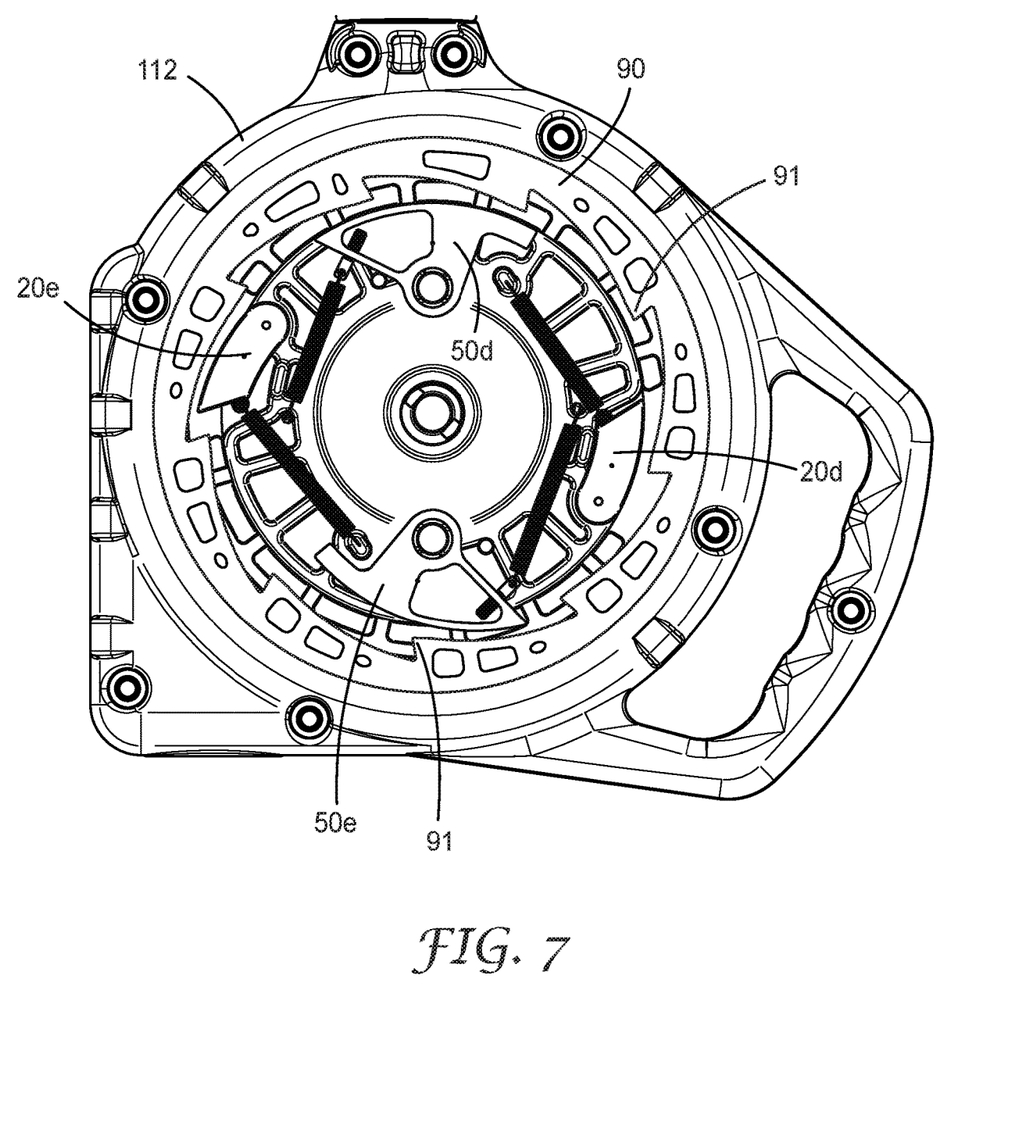
FIG. 7 is a cross-sectional plan view of an exemplary fall-protection apparatus with various components omitted and/or rendered transparent so that a ratchet of the fall-protection apparatus can be more easily seen.

As noted, the arrangements herein cause at least one pawl to engage with a tooth 91 of a ratchet 90 as indicated in exemplary embodiment in FIG. 7. This can either stop the rotation of drum 80 directly (e.g. in the case of a "hard-stop" arrangement as mentioned earlier herein), or can activate a friction brake that brings the rotation of drum 80 to a halt. It will be appreciated that numerous variations of ratchets, and the manner in which one or more pawls engage with a tooth of the ratchet, are possible. For example, in the exemplary arrangements depicted in the Figures herein, the pawls are configured so that the engaging end 22 of a pawl 20, or the engaging end of a pawl 50, will travel from a disengaged position to an engaged position by moving generally radially outward. Such arrangements are typically used with a radially-inward-facing ratchet (meaning a ratchet with radially inward-facing teeth; e.g. a ratchet ring of the general type exemplified by ratchet 90 of FIG. 7 herein). However, in some embodiments a velocity-actuated pawl 20, and/or an acceleration-actuated pawl 50, may be configured so that the engaging end of the pawl travels from a disengaged position to an engaged position by moving generally radially inward rather than outward, as noted above. Such arrangements may be used with a ratchet (e.g. a ratchet ring or disc) that is radially-outward-facing; for example, a ratchet ring of the general type depicted as item 142 in FIG. 3 of PCT Published Application WO2019/012454.

In some embodiments a ratchet, rather than being provided e.g. as a toothed disk or ring that is made separately and inserted into a housing of a fall-protection apparatus, may be provided e.g. as an integral (e.g. molded, cast, or machined) feature of the housing of the apparatus. Ratchet 90 as depicted in FIG. 7 herein is an example of this general type of ratchet. The PROTECTA fall-protection apparatus, available from 3M Fall Protection, Red Wing, MN, and discussed in more detail below, is another example of a product that uses this type of ratchet. Another possible variation in ratchet design is presented in U.S. Pat. No. 9,488,235, in which a ratchet takes the form of a single tooth ("stop member") that is provided as an integral part of a bracket (e.g., a load-bearing bracket) of a fall-protection apparatus. (The PROTECTA product, and the apparatus described in the '235 patent, rely on a completely different arrangement of pawls than disclosed herein; these items are cited merely to illustrate potential variations in ratchets.)

From the above discussions it will be clear that a ratchet of a rotationally-activated braking device can be any component (e.g. a toothed disk or ring or partial disk or partial ring, or a portion of a fall-protection bracket or housing) that presents at least one tooth that can be engaged by an engaging end of a pawl to initiate a braking operation of the rotationally-activated braking device. It is emphasized that the term "ratchet" is used for convenience of description; use of this term does not require that the ratchet and pawl(s) must necessarily be arranged e.g. so that relative rotation of these components is permitted in one direction but is precluded in the opposite direction. (However, the ratchet and pawl(s) can be arranged so that such functionality is provided if desired.)

In some embodiments a rotationally-activated braking device as disclosed herein can bring a drum to a "hard stop" (e.g. the braking device may rely on a ratchet that is non-rotatably fixed to the housing of the apparatus), as discussed earlier herein. However, in other embodiments a rotationally-activated braking device as disclosed herein will comprise (e.g. will work in concert with) a friction brake. In general, a friction brake will comprise at least one layer of friction material and at least one rotatable member, with a friction-braking surface of the layer of friction material being in contact (typically, at all times during ordinary use of the fall-protection apparatus) with a contact surface of the rotatable member. By a rotatable member is meant an item (e.g., a disk, ring, rotor, or the like) that is configured so that the member and the layer of friction material can be set into rotating motion relative to each other upon sufficient differential torque being applied to the layer of friction material and the rotatable member as the result of the engaging of a pawl with a ratchet of the rotationally-activated braking device. In many embodiments, the friction-braking surface of the layer of friction-braking material and the contact surface of the rotatable member are constantly pressed together to provide sufficient static frictional force that, as a human user moves about a workplace in ordinary use of the apparatus, there is no relative motion between the two surfaces. However, upon the engaging of a pawl with a ratchet of the rotationally-activated braking device, sufficient differential torque is generated to overcome the static frictional force, such that relative motion of the two surfaces (and hence relative motion of the rotatable member and the layer of friction material) may occur. The rotatable member and the layer of friction material are configured so that this relative rotation of the layer of friction material and the rotatable member will be slowed and/or brought to a halt by the frictional forces between the friction-braking surface of the layer of friction material and the contact surface of the rotatable member. The slowing of this relative rotation will serve to slow (e.g. halt) the rotation of a drum bearing a safety line.

Figure 3:
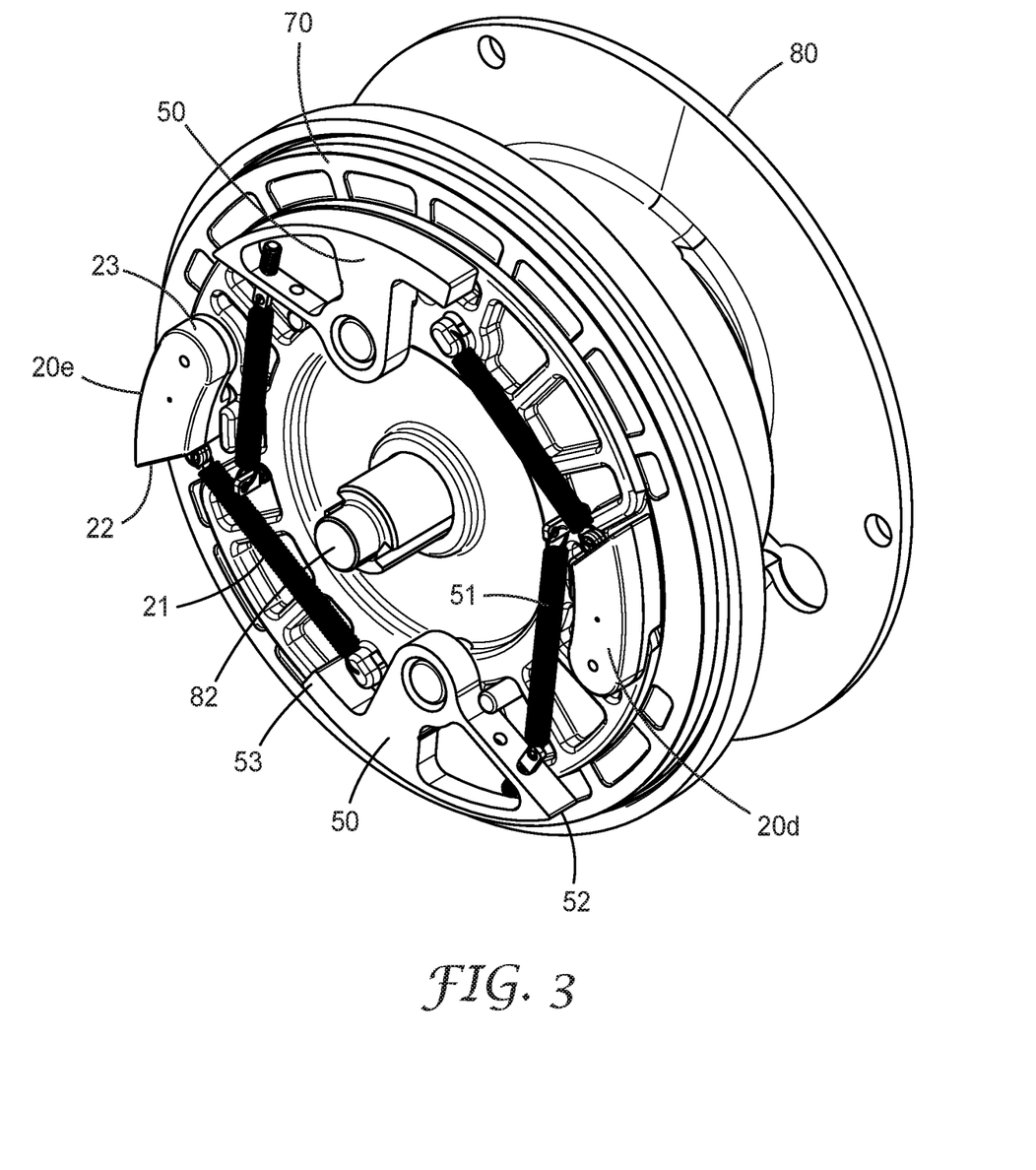
FIG. 3 is an isolated perspective exploded view of particular components of an exemplary fall-protection apparatus, including velocity-actuated pawls and acceleration-actuated pawls.

The above is a general description of a friction brake and its function; many variations are possible. In some embodiments, a rotationally-activated braking device 102 may comprise a friction brake 103 of the general type disclosed in the isolated exploded view of FIG. 3 of the above-mentioned U.S. patent application Ser. No. 16/630,584 and discussed in detail in the '584 application and in corresponding PCT Published Application WO2019/012454, both of which are incorporated by reference herein in their entirety. It will be appreciated that the particular design depicted in FIG. 3 of the '584 application is merely one example of a friction brake and of a ratchet arrangement; many different arrangements are possible. For example, FIG. 3 depicts a ratchet that comprises two contact surfaces and that is sandwiched between two layers of friction material. In other embodiments, a ratchet of a friction brake may only comprise a single contact surface which may be in contact with only a single layer of friction material. Furthermore, a ratchet may be radially inward-facing rather than radially outward-facing, as noted earlier herein. A friction brake that comprises a ratchet in the form of a radially-inward-facing toothed ring, and that comprises only a single contact surface that is in contact with a friction-braking surface of a single layer of friction material, is depicted in FIG. 4 of U.S. Pat. No. 8,430,206, which is incorporated by reference herein in its entirety.

In some embodiments, it may be convenient for a ratchet of the rotationally-activated braking device to serve as a rotatable member of the friction brake of the braking device. In many such designs, the ratchet is able to rotate with respect to the housing of the apparatus, but typically remains stationary during ordinary use of the apparatus. That is, the drum may rotate (relatively slowly) relative to the housing to extend and retract the safety line as a human user moves about a workplace. However, the ratchet, not being subjected to any rotational force, and being frictionally constrained by one or more layers of friction material, does not rotate relative to the housing. In the event that the drum begins to rotate rapidly e.g. due to a fall, the engaging end of a pawl engages with a tooth of the ratchet and overcomes this frictional constraint and causes the ratchet to rotate relative to the layer(s) of friction material and thus relative to the housing of the apparatus. The friction between the friction-braking surface of the friction material and the contact surface of the ratchet then slows or halts the rotation of the ratchet relative to the housing of the apparatus thus slowing or halting the rotating of the rotatable drum relative to the housing of the apparatus. The above-mentioned ratchet and friction brake of FIG. 4 of U.S. Pat. No. 8,430,206 is one example of such an arrangement.

In other embodiments, the rotatable member of a friction brake of a rotationally-activated braking device may not necessarily serve as a ratchet of the braking device. Rather, in some cases the ratchet of the rotationally-activated braking device and the rotatable member of the friction brake of the rotationally-activated braking device may be separate items. In one exemplary arrangement of this general type, a pawl-support plate (e.g. item 70 as described herein) may serve as a rotatable member of the friction brake. For example, a layer of friction material 72 may be arranged in between the pawl-support plate 70 and drum 80, with a first major frictional surface 73 of friction material 72 in contact with a contact surface 71 of plate 70 as shown in FIG. 2 herein. A second major frictional surface 74 of friction material 70 may similarly be in contact with a contact surface 83 of drum 80. The entire assembly can be pressed together to impart the desired frictional characteristics between these surfaces.

In such arrangements, pawl-support plate 70 and drum 80 may be configured so that they are able to rotate at least slightly relative to each other (e.g. through at least an arc of partial rotation) until brought to a stop by the friction material. With such an arrangement, the engaging of an engaging end of a pawl with a tooth of the ratchet will cause the pawl-support plate 70 on which the pawl is mounted to near-instantaneously cease rotating, while drum 80 may continue to rotate momentarily. The frictional force between the contact surface 71 of rotatable member (pawl-support plate) 70 and the first friction-braking surface 73 of the layer of friction material 70, and/or between the contact surface 83 of the drum and the second friction-braking surface 74 of the layer of friction material, will slow or halt the rotation of the drum. Often, the drum may be brought to a halt before the drum has completed, for example, one full revolution. (In some embodiments of this general type, the layer of friction material may be e.g. fixedly attached to the drum or to the pawl plate, so that the frictional interaction only occurs at one interface rather than at two interfaces.) The arrangement shown in the Figures herein (particularly as illustrated in FIGS. 2 and 7) is an example of this general approach. Various products available from 3M Fall Protection, Red Wing, MN, under the trade designation PROTECTA provide further examples of fall-protection products of this general type.

It will be appreciated that many variations of the above-presented exemplary arrangements may be employed. For example, a separate plate, e.g. attached to the drum or co-mounted on a common shaft so that the separate plate is not rotatable relative to the drum, may provide a contact surface for a layer of friction material, rather than having the friction material directly in contact with a wall of the drum. In some embodiments a layer of friction material may itself be disposed on (e.g. laminated or bonded to) a support plate as discussed herein. In other embodiments, a layer of friction material may be "free-standing" rather than being bonded to a support plate. Any suitable friction material may be used, e.g. cork, rubber, and so on. Friction materials that may be particularly useful are described in the PCT Published Application WO2019/012454.

The arrangements disclosed herein may be advantageously used in any fall-protection apparatus; in particular, in a self-retracting lifeline. In addition to the documents previously cited herein, fall-protection apparatus such as e.g. self-retracting lifelines in which the arrangements disclosed herein may be advantageously utilized, are described in U.S. Pat. Nos. 8,181,744, 8,256,574, 8,430,206, 8,430,207, 8,511,434, and 9,488,235, and in U.S. Published Patent Application 2016/0096048.

In some embodiments the fall-protection apparatus is a self-retracting lifeline which meets the requirements of ANSI Z359.14-2014. In general, the arrangements disclosed herein may be used in any fall-protection apparatus in which there is a desire to enhance the performance of the product, e.g. by minimizing the occurrence of nuisance lockups that may occur during movements about the workplace, while ensuring that the braking device responds as quickly as possible in the event of an actual fall.

In various embodiments, a fall-protection apparatus as described herein may be used in concert with, or as part of, any suitable fall-protection system such as e.g. a horizontal lifeline or retractable horizontal lifeline, a positioning lanyard, a shock-absorbing lanyard, a rope adjuster or rope grab, a vertical safety system (such as e.g. a flexible cable, rigid rail, climb assist, or fixed ladder safety system), a confined-space rescue system or hoist system, and so on. In some embodiments a fall-protection apparatus as disclosed herein may comprise a housing configured so that the interior of the apparatus is at least partially sealed (such as in the product line available from 3M Fall Protection under the trade designation (SEALED-BLOK) e.g. for use in harsh or marine environments. In some cases a fall-protection apparatus as disclosed herein may be suited for use in so-called "leading edge" workplace environments. It is still further noted that the discussions herein have primarily concerned apparatus (e.g. self-retracting lifelines) that comprise a housing that is e.g. mounted to an overhead anchorage and that comprises a safety line with a distal end that can be attached to a harness of a human user. It will be understood that the arrangements disclosed herein may also be used in e.g. "personal" self-retracting lifelines that comprise a housing that is mountable to a harness of a human user and that comprises a safety line with a distal end that can be attached e.g. to an overhead anchorage. Such apparatus are exemplified by the product line available from 3M Fall Protection under the trade designations TALON and NANO.

It will be understood that any such fall-protection apparatus may include, or be used with, various ancillary items which are not described in detail herein. Such items may include, but are not limited to, one or more of lanyards, shock absorbers, tear strips, harnesses, belts, straps, paddings, tool holsters or pouches, impact indicators, carabiners, D-rings, anchorage connectors, and the like. Many such apparatus, products, and components are described in detail e.g. in the 3M DBI-SALA Full-Line Catalog (Fall 2016). Although in many embodiments it may not be necessary due to the presence of the friction brake, in some embodiments the safety line of the apparatus may comprise an in-line shock absorber e.g. of the type described earlier herein. (An exemplary shock absorber is depicted in FIG. 1 of the previously-mentioned U.S. Pat. No. 9,488,235 patent, which is incorporated by reference in its entirety herein.) In other embodiments, no such shock absorber will be present. It will be understood that a fall-protection apparatus that is "non-motorized" as defined and described earlier herein, may still include such items as one or more electrically-powered sensors, monitors, communication units, actuators, and the like. Although discussions previously herein have primarily concerned products that completely arrest (stop) the motion of a human user, it is stipulated that in some embodiments, a fall-protection apparatus as described herein may serve merely to slow the fall of a user, and/or to allow the user to descend at a controlled rate.

It will be apparent to those skilled in the art that the specific exemplary elements, structures, features, details, configurations, etc., that are disclosed herein can be modified and/or combined in numerous embodiments. All such variations and combinations are contemplated by the inventor as being within the bounds of the conceived invention, not merely those representative designs that were chosen to serve as exemplary illustrations. Thus, the scope of the present invention should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof). Although various theories and possible mechanisms may have been discussed herein, in no event will such discussions serve to limit the claimable subject matter. To the extent that there is any conflict or discrepancy between this specification as written and the disclosure in any document that is incorporated by reference herein but to which no priority is claimed, this specification as written will control.

What is claimed is:

1. A fall-protection apparatus comprising:
   a drum with a safety line connected thereto; said drum being rotatable relative to a housing of the apparatus; and,
   a rotationally-activated braking device that comprises at least one first pawl, at least one second pawl, and at least one ratchet with at least one tooth that is engageable by an engaging end of the at least one first pawl or by an engaging end of the at least one second pawl, wherein the at least one first pawl is a velocity-actuated pawl that corresponds to rotational velocity of the drum, wherein the velocity-actuated pawl is configured to actuate to engage the at least one tooth in response to exceeding a predetermined threshold value of rotational velocity of the drum and wherein the at least one second pawl is an acceleration-actuated pawl that corresponds to a change in magnitude of velocity of the drum, wherein the acceleration-actuated pawl is configured to actuate to engage the at least one tooth in response to exceeding a predetermined threshold value of acceleration of the drum and wherein the at least one first pawl and the at least one second pawl are independently actuated and independently functioning.

2. The apparatus of claim 1 wherein the at least one first pawl is biased so that the engaging end of the at least one first pawl is urged toward a disengaged position; and, wherein the rotationally-activated braking device is configured so that upon rotation of the rotatable drum above the predetermined threshold value of rotational velocity, the engaging end of the at least one first pawl is urged by centrifugal force, into an engaged position in which it engages the at least one tooth of the ratchet.

3. The apparatus of claim 1 wherein the at least one first pawl comprises a pivot point that follows an orbital path as the drum rotates and wherein the at least one first pawl comprises a center of mass that is positioned so that the center of mass of the at least one first pawl follows an orbital path that at least generally coincides with the orbital path followed by the pivot point of the at least one first pawl.

4. The apparatus of claim 3 wherein when the at least one first pawl is in a fully disengaged position, the orbital path followed by the center of mass of the at least one first pawl, exhibits a diameter that is within plus or minus 4% of a diameter of the orbital path followed by the pivot point of the at least one first pawl.

5. The apparatus of claim 3 wherein the center of mass of the at least one first pawl is circumferentially offset from the pivot point of the at least one first pawl, along the orbital path of the pivot point of the at least one first pawl, by an offset angle of from at least 2 degrees, to at most 20 degrees.

6. The apparatus of claim 1 wherein the at least one second pawl is biased so that the engaging end of the at least one second pawl is urged toward a disengaged position; and, wherein the rotationally-activated braking device is configured so that upon rotation of the rotatable drum above the predetermined threshold value of acceleration, the engaging end of the at least one second pawl is urged into an engaged position in which it engages the at least one tooth of the ratchet.

7. The apparatus of claim 1 wherein the at least one second pawl comprises a pivot point and wherein the at least one second pawl comprises a center of mass that lies at least generally on a line that extends through an axis of rotation of the drum and the pivot point of the at least one second pawl; and, wherein the center of mass of the at least one second pawl is radially offset from the pivot point of the at least one second pawl, from at least 10% to at most 50%.

8. The apparatus of claim 7 wherein the center of mass of the at least one second pawl is radially offset from the pivot point of the at least one second pawl, from at least 20% to at most 40%.

9. The apparatus of claim 7 wherein the center of mass of the at least one second pawl lies within an angular arc of plus or minus 4 degrees from the line that extends through the axis of rotation of the drum and the pivot point of the at least one second pawl.

10. The apparatus of claim 1 wherein the at least one first, velocity-actuated pawl, and the at least one second, acceleration-actuated pawl, are mounted on a pawl-support plate that is configured to rotate along with the drum until rotation of the pawl-support plate is slowed or stopped by the engaging of the engaging end of the at least one first pawl or the at least one second pawl, with the at least one tooth of the ratchet.

11. The apparatus of claim 10 wherein the at least one first pawl is biased by a biasing spring acting in tension so that the engaging end of the at least one first pawl is urged generally radially inwardly toward a disengaged position of the at least one first pawl and wherein the rotationally-activated braking device is configured so that upon rotation of the rotatable drum above the predetermined rotational velocity, the engaging end of the at least one first pawl is urged by centrifugal force, generally radially outwardly into an engaged position of the at least one first pawl in which it engages the at least one tooth of the ratchet; and, wherein the at least one second pawl is biased by a biasing spring acting in tension so that the engaging end of the at least one second pawl is urged generally radially inwardly toward a disengaged position of the at least one second pawl; and, wherein the rotationally-activated braking device is configured so that upon rotation of the rotatable drum above the at least one predetermined acceleration, the engaging end of the at least one second pawl is urged generally radially outwardly into an engaged position of the at least one second pawl in which it engages the at least one tooth of the ratchet.

12. The apparatus of claim 10 wherein the at least one first, velocity-actuated pawl comprises a pair of first, velocity-actuated pawls that are in circumferentially-opposing positions on the pawl-support plate from each other; and, wherein the at least one second, acceleration-actuated pawl comprises a pair of second, acceleration-actuated pawls that are in circumferentially-opposing positions on the pawl-support plate from each other; and, wherein the velocity-actuated pawls and the acceleration-actuated pawls are circumferentially spaced along a circular path along the pawl-support plate.

13. The apparatus of claim 10 wherein the apparatus is configured so that the pawl-support plate and the drum are in fixed relation so that the drum cannot rotate relative to the pawl-support plate, and wherein the apparatus is configured so that upon engaging of the engaging end of the at least one first, velocity-actuated pawl or of the engaging end of the at least one second, acceleration-actuated pawl with a tooth of the ratchet, the pawl-support plate and the drum are both brought to a hard stop.

14. The apparatus of claim 10 wherein the braking device comprises a friction brake comprising a layer of friction material and a rotatable member with a contact surface that is in contact with a friction-braking surface of the layer of friction material, and wherein the braking device is configured so that upon engaging of the engaging end of the at least one first, velocity-actuated pawl or of the engaging end of the at least one second, acceleration-actuated pawl with the at least one tooth of the ratchet, the pawl-support plate is brought to a stop but the drum continues to rotate relative to the pawl-support plate until brought to a halt by the friction brake.

15. The apparatus of claim 14 wherein a plate attached to the pawl-support plate serves as the rotatable member of the friction brake.

16. The apparatus of claim 10 wherein the braking device comprises a friction brake comprising a layer of friction material that is in contact with a surface of the ratchet, and wherein the braking device is configured so that upon engaging of the engaging end of the at least one first, velocity-actuated pawl or of the engaging end of the at least one second, acceleration-actuated pawl with the at least one tooth of the ratchet, the ratchet begins to rotate and continues to rotate until brought to a halt by the friction brake.

17. The apparatus of claim 1 wherein the safety line that is attached to the drum includes an in-line shock-absorber.

18. The apparatus of claim 1 wherein the apparatus is a self-retracting lifeline in which the safety line comprises a proximal end that is connected to the rotatable drum and a distal end that is attachable to a harness of a human user of the apparatus or to an anchorage of a workplace, and in which the rotatable drum is biased toward rotating in a direction that will retract the safety line onto the drum.

19. The apparatus of claim 1 wherein the at least one ratchet is provided as a radially-outward-facing toothed disk or as a radially-inward-facing toothed ring.

20. The apparatus of claim 1 wherein the at least one ratchet, and the at least one tooth thereof, is provided as an integral feature of the housing of the apparatus, and wherein the ratchet is a radially-inward-facing ratchet.

\* \* \* \* \*

UNITED STATES PATENT AND TRADEMARK OFFICE
CERTIFICATE OF CORRECTION

| | | |
|---|---|---|
| PATENT NO. | : 11,759,662 B2 | Page 1 of 1 |
| APPLICATION NO. | : 18/013164 | |
| DATED | : September 19, 2023 | |
| INVENTOR(S) | : Greg E Schrank | |

It is certified that error appears in the above-identified patent and that said Letters Patent is hereby corrected as shown below:

In the Claims

<u>Column 21</u>
Line 35, In Claim 13, delete "a tooth" and insert -- at least one tooth --, therefor.

Signed and Sealed this
Nineteenth Day of March, 2024

Katherine Kelly Vidal
*Director of the United States Patent and Trademark Office*